United States Patent [19]

Hasegawa

[11] 4,385,319
[45] May 24, 1983

[54] SYNCHRONIZATION SIGNAL SEPARATING CIRCUIT

[75] Inventor: Kenichi Hasegawa, Neyagawa, Japan

[73] Assignee: Matsushita Electric Industrial Co., Ltd., Kadoma, Japan

[21] Appl. No.: 206,677

[22] Filed: Nov. 13, 1980

[30] Foreign Application Priority Data

Nov. 16, 1979 [JP] Japan .............................. 54-149379

[51] Int. Cl.³ .............................................. H04N 5/08
[52] U.S. Cl. ................................................... 358/153
[58] Field of Search ......................... 358/153; 328/139

[56] References Cited

U.S. PATENT DOCUMENTS

| | | | |
|---|---|---|---|
| 3,706,847 | 12/1972 | Smeulers | 358/153 |
| 3,809,808 | 5/1974 | Arpin | 358/153 |
| 4,097,896 | 6/1978 | Avery | 358/153 |
| 4,185,299 | 1/1980 | Harford | 358/153 |

Primary Examiner—Richard Murray
Attorney, Agent, or Firm—Cushman, Darby & Cushman

[57] ABSTRACT

A synchronization signal separating circuit for deriving synchronization signals from a composite video signal,
a clamp circuit which clamps the sync chip level of the composite video signal to a reference voltage level,
a detection circuit which detects a voltage of the back porch part of the clamped composite video signal,
a mixing circuit generating intermediate voltage between the reference voltage and the back porch part voltage as a threshold level, and
a separating circuit which derives the synchronization signal from the clamped composite video signal based on the threshold level, thereby the accurate synchronization signal can be obtained by utilizing the abovementioned clamping level at the intermediate voltage.

9 Claims, 21 Drawing Figures

SYNCHRONIZATION SIGNAL SEPARATING CIRCUIT

BACKGROUND OF THE INVENTION

1. Field of the Invention

This invention relates to a synchronization signal separating a circuit for separating synchronization signal from a composite video signal.

2. Description of the Prior Art

In general, it is desirable that a synchronization signal separating circuit for separating a synchronization signal from a composite video signal have, the following characteristics:

(1) The operation of the synchronization signal separating circuit is not influenced by a curve of the front edge of the synchronization signal;
(2) The operation of the circuit is not influenced by superimposed noise on the synchronization signal;
(3) A large allowable limit for a level change of the composite video signal can be accomodated, and a composite video signal of poor quality with shrinking synchronization signal can be used without any trouble or mal-operation of the circuit;
(4) Use of composite video signal with sag is allowable.

It is very difficult to fulfill all of these requirements, as mentioned below in more detail, and therefore the conventional synchronization signal separating circuit was designed in a compromising way.

FIG. 1 shows various composite video signals for an explanation of the required performance. An ideal waveform is shown in FIG. 1(a). FIG. 1(b), however, shows a waveform with curves at the front edges of a synchronization signal. In general, a separation of the synchronization signal from the composite video signal is made by using a preset threshold level. When a voltage $V_1$ is set as the threshold level as shown in FIG. 1(b), it is impossible to obtain a separated synchronization signal having front edges at the position identical to that of the original synchronization signal which is the component of the composite video signal. Where a voltage $V_2$ as shown in FIG. 1(b) is the threshold level, the synchronization signal can be accurately separated.

The curves at the front edges of the synchronization signal, such as that of FIG. 1(b), almost always appear in a composite video signal as reproduced by a simplified magnetic video recoder for home use. The genesis of such curves will be explained with reference to FIG. 2. FIG. 2(a) shows one example of an original composite video signal. FIG. 2(b) shows the composite video signal wherein the high frequency component thereof is emphasized by a pre-emphasis circuit before frequency modulation. The pre-emphasized composite video signal is clipped at higher and lower predetermined levels as shown in FIG. 2(c) in order to limit the width of side bands of the modulated signal. This is an operation necessary for the simplified magnetic video recoder for home use, since recordable bandwidth thereof is narrow. When the operated composite video signal is modulated and recorded as a FM signal and the recorded FM signal thereafter is reproduced, the composite video signal as illustrated in FIG. 2(c) can obtained. However, the waveform of the reproduced composite video signal is deformed as shown in FIG. 2(d) by a deemphasis circuit. When comparing the deformed composite video signal (FIG. 2(d)) with the original composite video signal (FIG. 2(a)), curving of the front edges of the synchronization signal is readily apparent. In recent years, with the advancement of the record density on the magnetic recording tape, the strength of the preemphasis circuit becomes stronger, and therefore, the phenomenon of such curving of the synchronization circuit is getting worse. The strength of the pre-emphasis is closely related to the S/N ratio, the frequency characteristics, etc. of the reproduced composite video signal. Accordingly, the strength of the preemphasis can not be easily be decreased in order to avoid such curving.

The required performance of the synchronization signal separating circuit is elucidated again referring to FIG. 1. FIG. 1(c) shows a composite video signal with noise. If the threshold level is set as a voltage $V_3$ as shown in FIG. 1(c), accurate operation is performed. However, if the threshold level is considerably higher or lower than the voltage $V_3$, the superimposed noise will influence the separating operation, and accurate operation can not be expected.

Next, FIG. 1(d) shows a composite video signal including synchronization signals of changing amplitudes. In FIG. 1(d), the signal level of a period $T_2$ of the composite video signal goes down as compared with that of the period $T_1$, and the synchronization signal of the period $T_3$ is small as compared with that of the period $T_1$. Such shrinking of the synchronization signal may appear when the television broadcasting wave is transmitted via many tandem offices, or by some television broadcasting wave of a CATV. If the threshold level is a voltage $V_4$ as shown in FIG. 1(d), the separated synchronization signal becomes erroneous for the composite video signal of the periods $T_2$ and $T_3$. In this case, the threshold level must be a voltage $V_5$ as shown in FIG. 1(d) in order to separate the synchronization signal accurately.

Finally, FIG. 1(e) shown an example of a waveform of a composite video signal with sag due to poor low frequency characteristics in the transmitting system. If the threshold level is set at a voltage $V_3$ as shown in FIG. 1(e), there is a period when the synchronization signal can not be separated.

It is very difficult to fulfill all the requirements 1, 2, 3 and 4 listed above. The detecting level should be selected as high as possible in order to improve the above-mentioned items (1) and (4) as shown in FIGS. 1(b) and (e), and should be selected in the middle level between that of the front or back porch (portions of the composite video signal immediately following the sync pulses) and of the sinc chip in order to improve the item (2). On the contrary, the detected level should be selected as low as possible in order to improve the item (3). Therefore, in practice, a compromise between these items is made according to some priority order. Alternatively, an automatic gain control circuit is preferably provided at the pre-stage of the synchronization signal separating circuit in order to lighten the condition of the item (3).

SUMMARY OF THE INVENTION

This invention provides an improved synchronization signal separating circuit which does not have the above-mentioned disadvantages. Namely, the synchronization signal separating circuit of the present invention can select the synchronization signals accurately from each of the various types of poor quality composite video signals.

DESCRIPTION OF THE PREFERRED EMBODIMENT

The synchronization signal separating circuit of the present invention comprises:

- a reference voltage source which generates a predetermined reference DC voltage,
- a clamp circuit which receives the composite video signal and a reference voltage from the reference voltage source, and clamps the sync chip level of the composite video signal to the reference voltage level,
- a detection circuit which receives the clamped composite video signal from the clamp circuit, and detects the voltage of the back porch part from the clamped composite video signal,
- a mixing circuit which receives the reference voltage from the reference voltage source and detected voltage of the detection circuit and generates a signal of an intermdeiate voltage between the reference voltage and the detected voltage, and
- a separating circuit for deriving synchronization signal by comparing the clamped composite video signal with said intermediate voltage signal.

Figure 3:
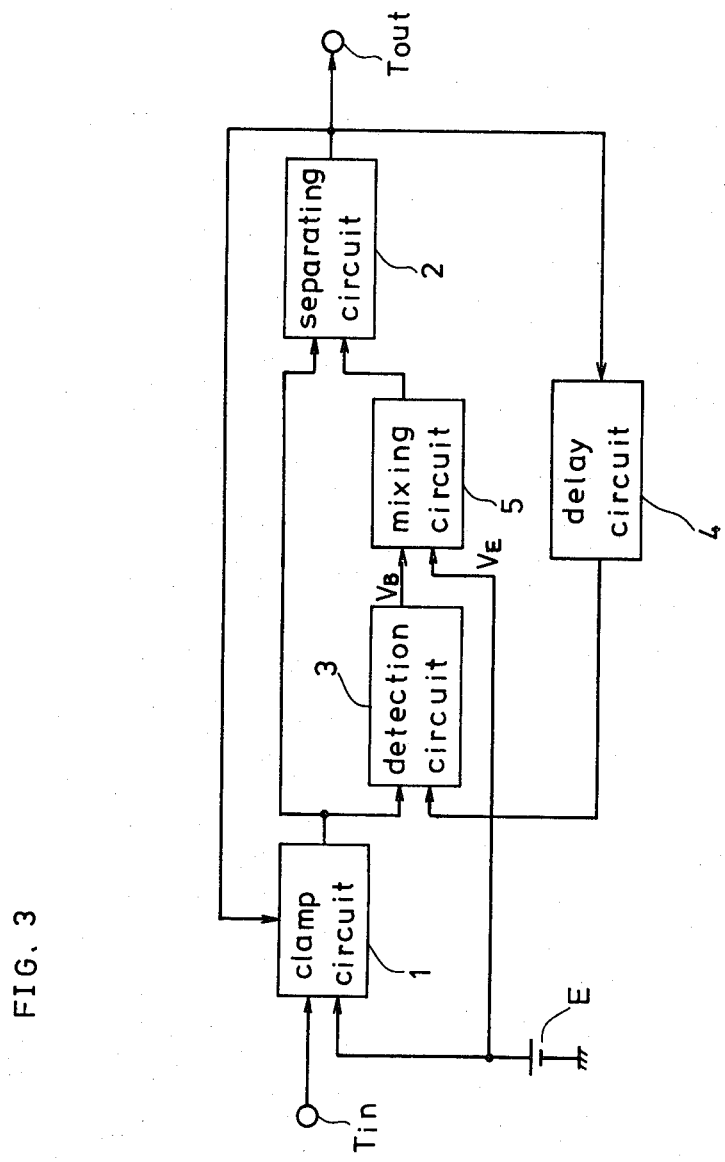
FIG. 3 is a block diagram showing one of the preferred embodiments of the present invention.

FIG. 3 shows a block diagram of the preferred embodiment of the present invention.

In FIG. 3, a composite video signal is fed to a clamp circuit 1 through an input terminal $T_{in}$. A reference voltage $V_E$ of a reference voltage source E is applied to the clamp circuit 1 as a clamp voltage, and furthermore, a synchronization signal, namely an output signal of a separating circuit 2 is applied to the clamp circuit 1 as a switching signal. The composite video signal is fed through the clamp circuit 1 to a detection circuit 3 and to the separating circuit 2. The detection circuit 3 detects a back porch voltage $V_B$ of the clamped composite video signal based on a delayed pulse applied from a delay circuit 4. The detected signal $V_B$ is applied to a mixing circuit 5. The mixing circuit 5 generates an intermediate voltage $V_A$ between the detected voltage $V_B$ and the reference voltage $V_E$ of the reference voltage source E, and feeds the intermediate voltage $V_A$ to the separating circuit 2. The separating circuit 2 derives a synchronizing signal from the clamped composite video signal by the voltage $V_A$ as a threshold voltage, and feeds the synchronizing signal to the delay circuit 4, the clamp circuit 1 and an output terminal $T_{out}$. The delay circuit 4 delays the synchronizing signal, and thereby generates a delayed signal pulse having a shorter pulse width than that of the back porch part and lies in the back porch period.

According to the present invention, the abovementioned required performances are realized as mentioned below.

Figure 1:
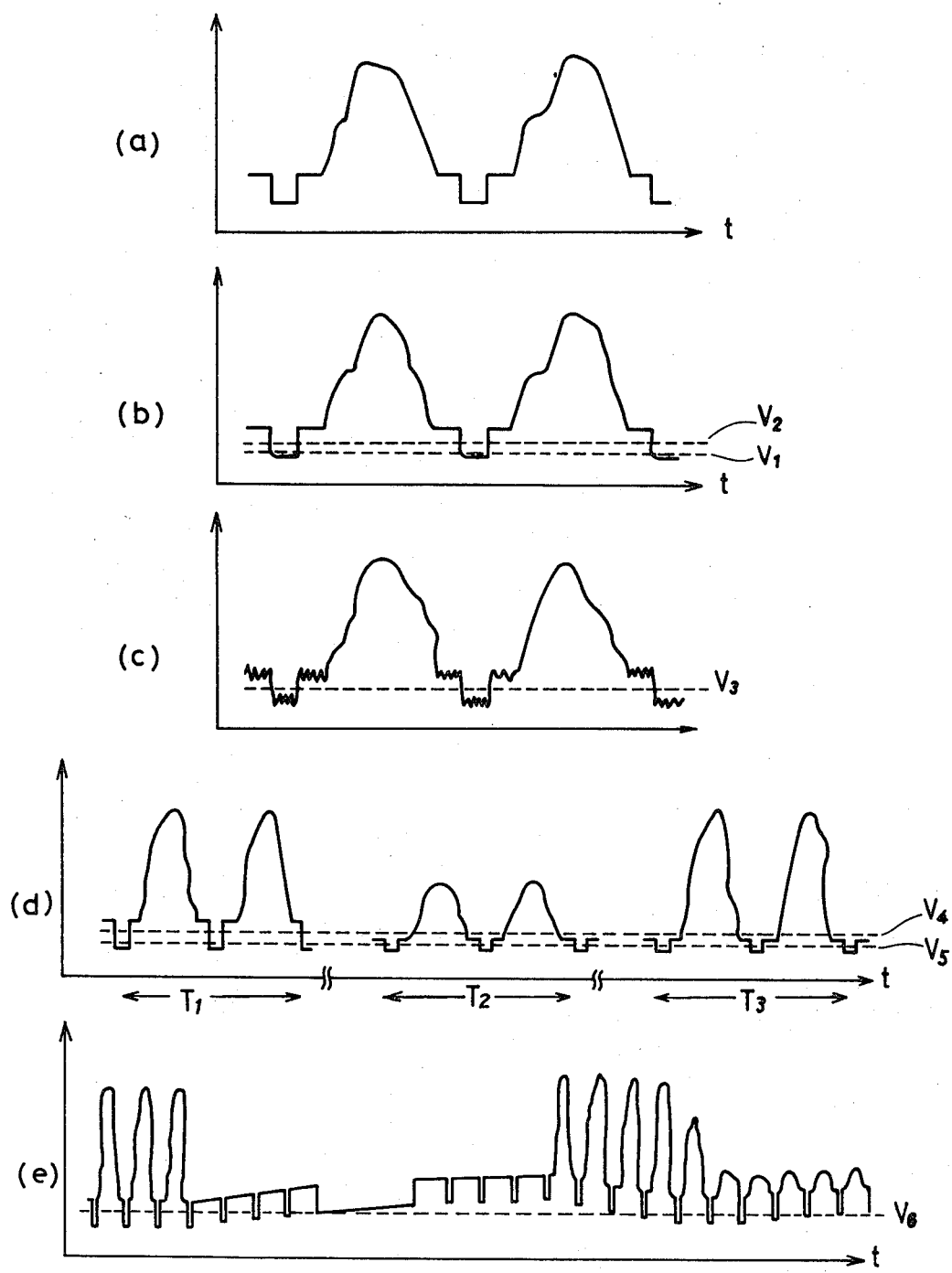
FIG. 1(a) is an ideal waveform of the composite video signal.
FIGS. 1(b) to 1(e) are various waveforms of poor quality composite video signals, respectively.
Figure 2:
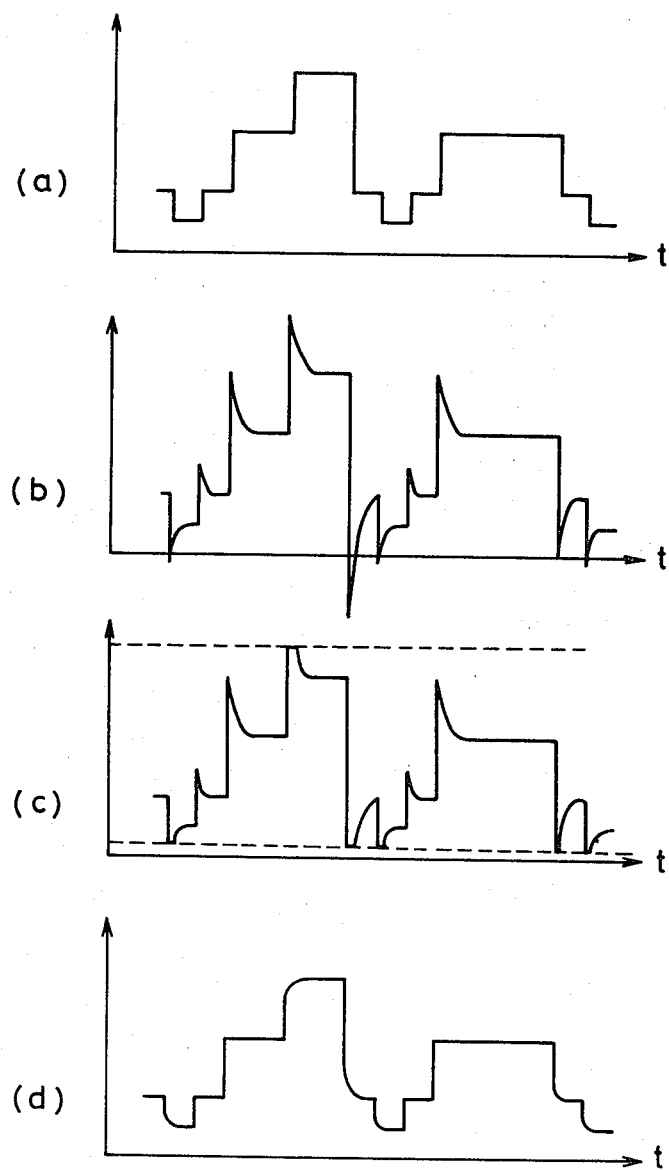
FIGS. 2(a) to 2(d) are waveforms of composite video signals of various processes.

At first, as to a composite video signal with curve at the front edge of the synchronization signal as shown in FIG. 1(b), the threshold level should be set equal to or higher than the voltage $V_2$. In the preferable embodiment, the output voltage $V_A$ of the mixing circuit 5 is determined by the following equation:

$$V_A = (V_B + V_E)/2 \qquad (1)$$

Figure 6:
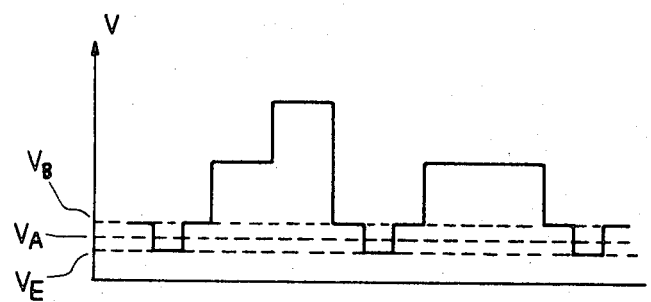
FIG. 6 is a waveform chart showing the relations among voltage levels in the present invention.

When the output voltage $V_A$, that is the threshold voltage, has such values, as shown in FIG. 6 the synchronization signal can be separated without adverse influence of the curves of the composite video signal.

As to the composite video signal with noise as shown in FIG. 1(c), the output voltage $V_A$ is set in the middle of the back porch part voltage $V_B$ and the voltage $V_E$ of the synchronization signal part in order to avoid adverse influence the best. Namely, the output voltage $V_A$ should be determined as the abovementioned equation (1).

As to the composite video signal with changing the amplitude of the synchronization signal as shown in FIG. 1(d), the threshold level of the synchronization signal separating circuit of the present invention responds automatically to the changing. Namely, in case the amplitude of the synchronization signal changes, the voltage of the synchronization signal part is clamped at the reference voltage $V_E$, and usually, the voltage $V_B$ of the back porch part is detected, and therefore the voltage $V_A$ is automatically selected between these two voltages responding with the amplitude of the synchronization signal.

Finally, as to the composite video signal with sag as shown in FIG. 1(e), since the voltage of the synchronization signal is usually clamped to the reference voltage $V_E$, bad influence based on sag can be automatically eliminated.

Figure 4:
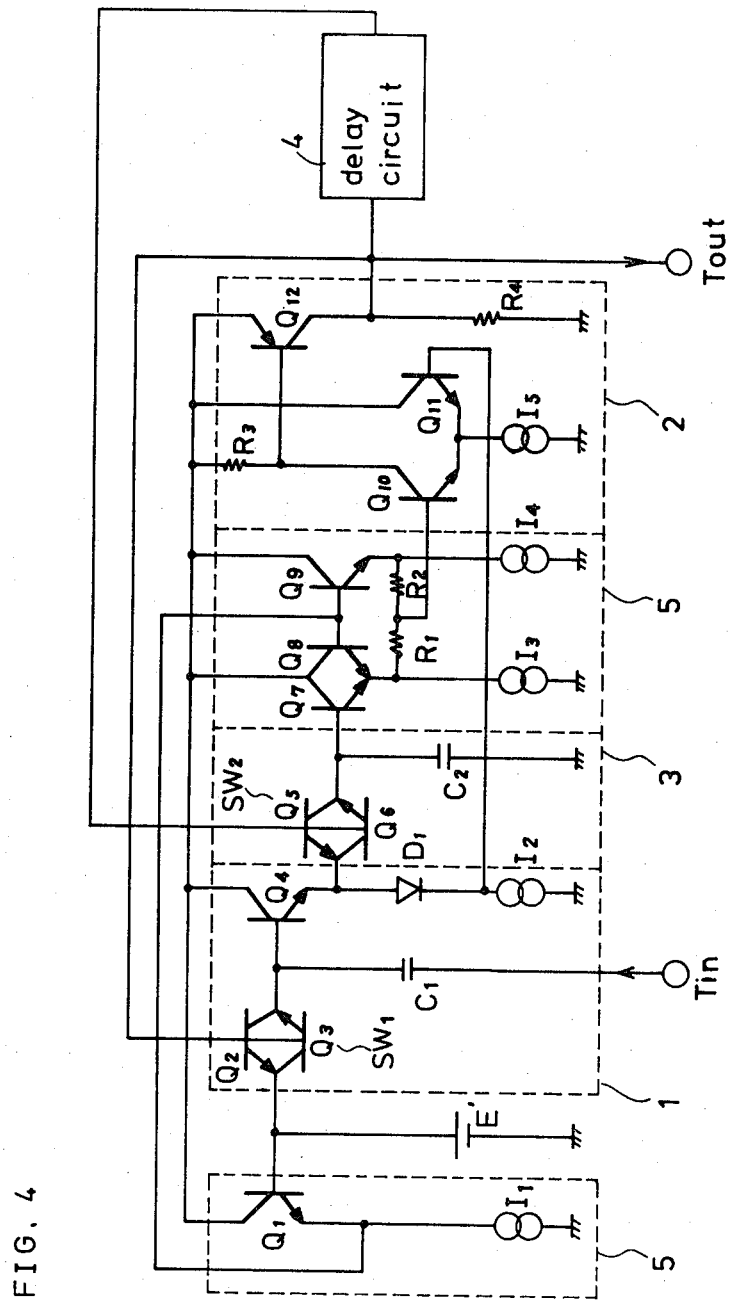
FIG. 4 is a circuit diagram showing one of the preferred embodiments of the present invention.

FIG. 4 shows a schematic diagram of one embodiment in accordance with the block diagram of FIG. 3. In FIG. 4, the clamp circuit 1 consists of transistors $Q_2$, $Q_3$ and $Q_4$, a diode $D_1$, a constant current source $I_2$, and a capacitor $C_1$. The transistor $Q_2$ and $Q_3$ are connected inversely and in parallel to each other, thereby forming an analog switch $SW_1$ which is controlled by a signal applied to base electrodes thereof. One of input terminals of the analog switch $SW_1$ is connected to a reference voltage source E' which generates $V_E'$ ($V_E' = -V_E + V_D$). $V_D$ is a voltage of forward junction voltage of a transistor or a diode, that is, about 0.7 V. The other one terminals of the analog switch $SW_1$ is connected to the base of the transistor $Q_4$ of an emitter follower connection. The capacitor $C_1$ is connected between the input terminal $T_{in}$ and the base of the transistor $Q_4$, and the emitter of the transistor $Q_4$ is connected to the constant current source $I_2$ through the diode $D_1$. The emitter of the transistor $Q_4$ is also connected to an input terminal of the detection circuit 3, which comprises transistors $Q_5$ and $Q_6$, and a capacitor $C_2$. The transistors $Q_5$ and $Q_6$ also form another analog switch $SW_2$ for detecting the voltage $V_B$ of the back porch part, an input terminal of the analog switch $SW_2$ is connected to the emitter of the transistor $Q_4$, and an output terminal thereof is connected to the mixing circuit 5. The mixing circuit 5 consists of transistors $Q_1$, $Q_7$, $Q_8$ and $Q_9$, resistors $R_1$ and $R_2$ and constant current sources $I_1$, $I_3$ and $I_4$. The transistor $Q_8$ is only used for starting the operation of this circuit, and the transistor $Q_7$ is used in an emitter follower connection. The reference voltage source E' is applied to the base electrode of the transistor $Q_9$ through the transistor $Q_1$ of the emitter follower connection. The transistor $Q_9$ is also used in an emitter follower connection, and the resistors $R_1$ and $R_2$ are connected in series across the emitter electrodes of the transistors $Q_7$, $Q_8$ and $Q_9$. In the preferred embodiment, the resistance of the resistor $R_1$ is selected equal to that of the resistor $R_2$ so as to realize the equation (1). An output signal of the mixing circuit 5, which is obtained from the center connecting point of the series connection, is applied to the separating circuit 2. The separating circuit 2 consists of transistors $Q_{10}$, $Q_{11}$ and $Q_{12}$, and resistors $R_3$ and $R_4$, and a constant current source $I_5$. The transistors $Q_{10}$ and $Q_{11}$ form a differential amplifier operating as a comparator, an output signal of the differential amplifier is fed to the transistor $Q_{12}$ for inverting signal phase. An output signal of the separating circuit 2, which is obtained from the collector of the transistor $Q_{12}$, are fed to the output terminal $T_{out}$, the delay circuit 4 and the analog switch $SW_2$ as a control signal.

Figure 7:
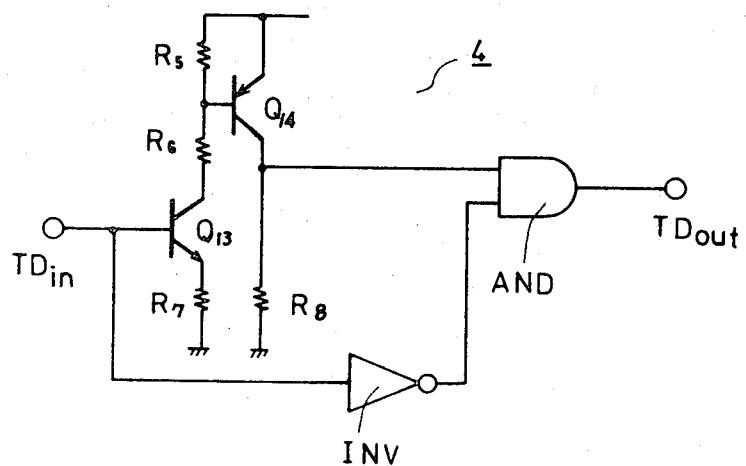
FIG. 7 is a circuit diagram of an embodiment of a delay circuit 4.

The delay circuit 4 can be easily constructed by using two monostable multi-vibrators. FIG. 7 shows one example of the delay circuit 4 which does not include any capacitors and is thus suitable for use in an IC. In the circuit of FIG. 7, an input terminal $TD_{in}$ is connected to a series connection body of resistors $R_5$, $R_6$, transistor $Q_{13}$ and resistor $R_7$ for inverting signal phase. The base electrode of a transistor $Q_{14}$ is connected to the connecting point of the resistors $R_5$ and $R_6$, and the output signal at the collector electrode thereof is fed to one of input terminals of an AND gate AND. The other input terminal of the AND gate AND has applied the input signal to the delay circuit 4 through an inverter INV. The output terminal of the AND gate AND is connected to an output terminal $TD_{out}$.

Operation

Figure 5:
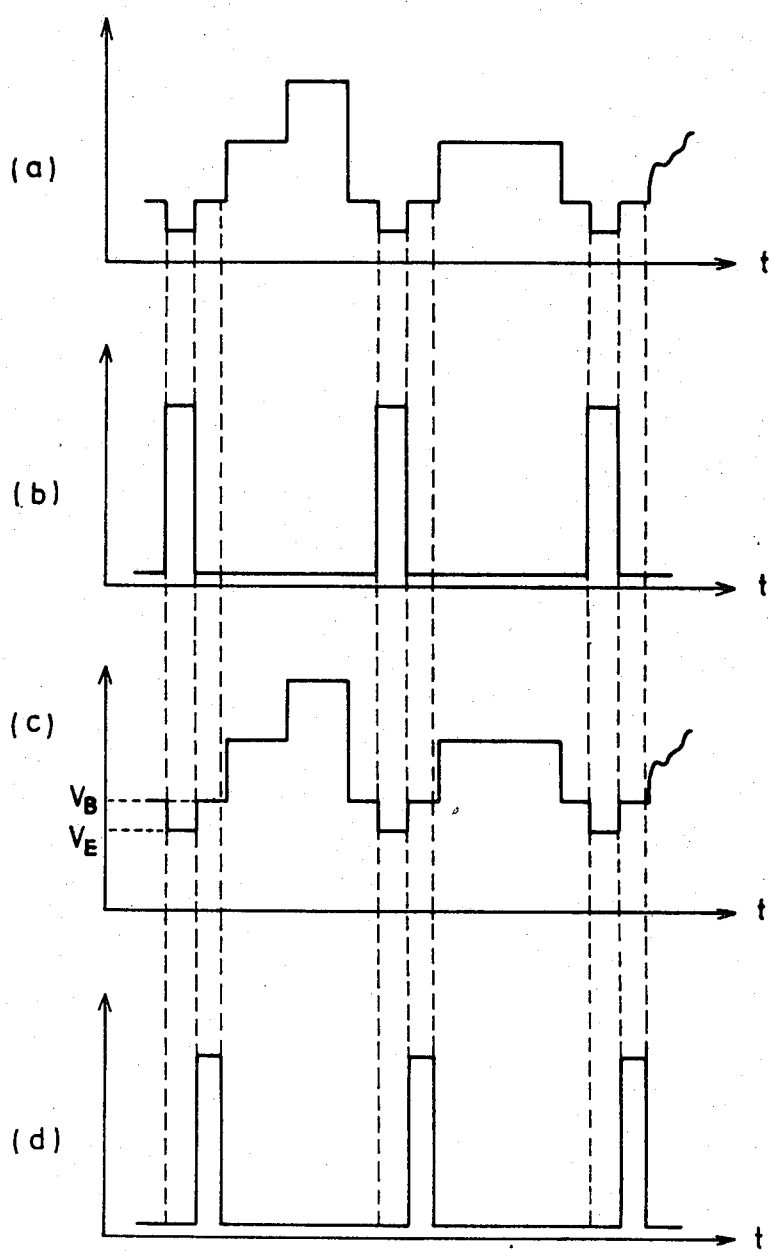
FIGS. 5(a) to 5(d) are waveform charts showing waveforms at different parts of the circuit of FIG. 4.
Figure 8:
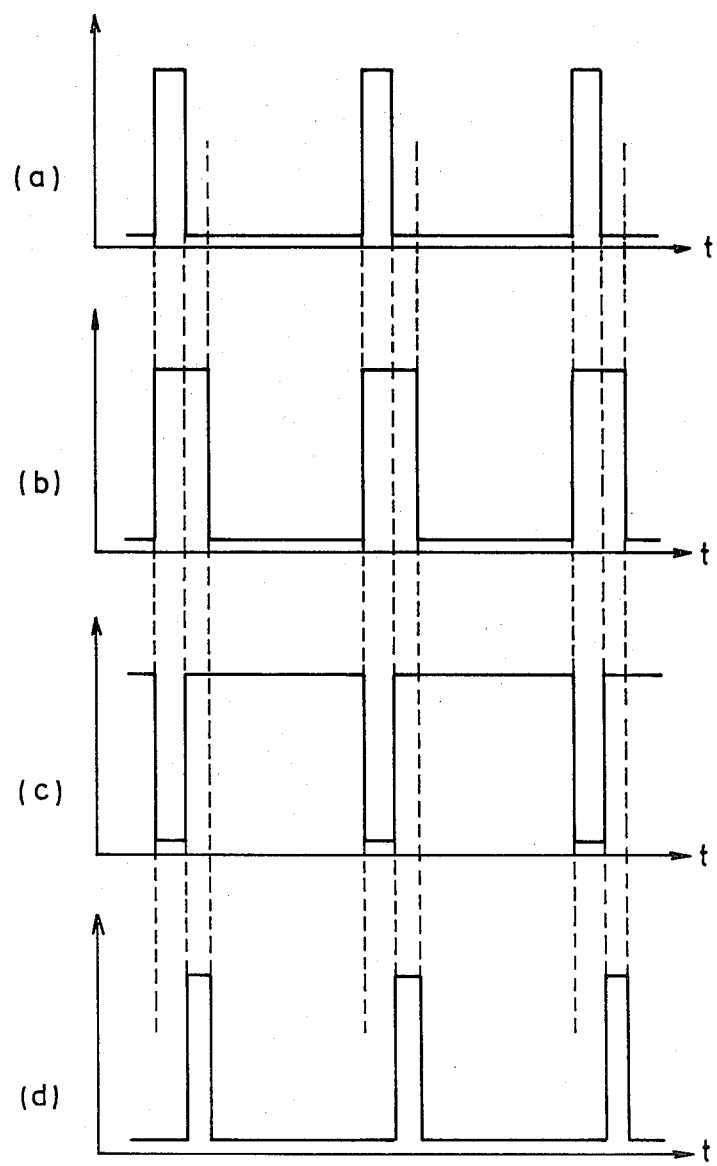
FIGS. 8(a) to 8(d) are waveform charts showing waveforms at different parts of the circuit of FIG. 7.

An operation of the abovementioned embodiment is elucidated below, referring to FIGS. 4, 5 and 8.

FIG. 5(a) shows a waveform of a composite video signal applied to the input terminal $T_{in}$. The synchronization signal as shown in FIG. 5(b) is obtained from the separating circuit as explained below, and applied to the bases of the transistors $Q_2$ and $Q_3$. During the period the synchronization signal is applied, the capacitor $C_1$ is charged up to the reference voltage $V_E'$ of the reference voltage source E' through the analog switch $SW_1$. The capacitance of the capacitor $C_1$ is selected sufficiently large so that the composite video signal given from the terminal $T_{in}$ is added to the reference voltage $V_E'$. Hence, the composite video signal at the base of the transistor $Q_4$ is clamped by the reference voltage $V_E'$. The clamped composite video signal is fed to the input terminal of the detection circuit 3 through the emitter follower connection of the transistor $Q_4$. Signal level of the clamped composite video signal at the emitter of the transistor $Q_4$ is lowered by $V_D$ by the transistor $Q_4$. Therefore, the sinc chip level of the composite video signal is determined at the reference voltage $V_E$ as shown in FIG. 5(c).

As will be explained below, the synchronization signal is delayed by the delay circuit 4 as shown in FIG. 5(d), and the delayed signal is applied to the analog switch $SW_2$. Therefore, the clamped composite video signal is applied to the capacitor $C_2$ through the analog switch $SW_2$ during the period the delayed signal is on. Then, in the detecting circuit 3, the voltage $V_B$ of the back porch part of the composite video signal in FIG. 5(c) is detected at the capacitor $C_2$. The capacitance of the capacitor $C_2$ is selected sufficiently large so that the base voltage of the transistor $Q_7$ is kept approximately at the back porch voltage $V_B$. The reference voltage $V_E'$ of the reference voltage source E' is fed to the base electrode of the transistor $Q_9$ through the emitter follower circuit of the transistor $Q_1$, therefore the base voltage of the transistor $Q_9$ is also kept at the reference voltage $V_E$ ($V_E = V_E' - V_D$). These DC signals are current amplified by the transistors $Q_7$ and $Q_9$, and voltages $V_B - V_D$, $V_E - V_D$ are obtained at the emitter electrodes of the transistors $Q_7$ and $Q_9$, respectively. Therefore, the voltage of the common connecting point of the resistors $R_1$ and $R_2$, namely the base voltage $V_{Q_{10}-B}$ becomes $$V_{Q_{10}-B} = \frac{(V_B - V_D) \cdot R_2 + (V_E - V_D) \cdot R_1}{R_1 + R_2}$$

$$= \frac{V_B \cdot R_2 + V_E \cdot R_1}{R_1 + R_2} - V_D.$$

When this synchronization signal separating circuit starts, the transistor $Q_8$ keeps the emitter voltage of the transistor $Q_7$ at $V_E - V_D$ during the period the voltage of the capacitor $C_2$ reaches a constant value of $V_B$. Once the voltage of the capacitor $C_2$ reaches $V_B$, the transistor $Q_8$ turns off, and therefore it can be disregarded hereafter in considering the operation of this circuit. On the other hand, the clamped composite video signal illustrated in FIG. 5(c) is applied to the base electrode of the transistor $Q_{11}$ through the diode $D_1$. At that time the signal level is lowered by the $V_D$ voltage by the diode $D_1$, that is, the base voltage $V_{Q_{11}-B}$ of the transistor $Q_{11}$ becomes $V_{Q_{11}-B} = V_E - V_D$ (for synchronization periods), $V_{Q_{11}-B} = V_B - V_D$ (for back porch periods).

In the separating circuit 2, the clamped voltage is compared with the intermediate voltage by the differential amplifier of the transistor $Q_{10}$ and $Q_{11}$, and thereby the synchronization signal is obtained at the collector of the transistor $Q_{10}$. The synchronization signal is inverted by the transistor $Q_{12}$ as shown in FIG. 5(b).

An operation of the delay circuit 4 of FIG. 7 is elucidated below. The synchronization signal applied to the input terminal $TD_{in}$ is inverted by the circuit of transistor $Q_{13}$, resistors $R_5$, $R_6$ and $R_7$. The inverted signal is fed to the base of the transistor $Q_{14}$, and the transistor $Q_{14}$ is driven to its saturation region. An extended synchronization signal is thus obtained at the collector of the transistor $Q_{14}$ by the storage effect as shown in FIG. 8(b). The synchronization signal is inverted by the inverter INV as shown in FIG. 8(c) and the inverted synchronization signal is applied to the input electrodes of the AND gate AND. The delay signal can thus be obtained at the output terminal $TD_{out}$ as shown in FIG. 8(d). The delayed signal is applied to the base electrodes of the analog switch $SW_2$, and the detection circuit 3 detects the back porch voltage $V_B$ as mentioned above.

According to the present invention, the threshold level is precisely decided based on the voltage of sinc chip and the back porch voltage of the composite video signal, to provide accurate operation.

What is claimed is:

1. A synchronization signal separating circuit for deriving synchronization signals from a composite video signal comprising:
    a reference voltage source which generates a predetermined reference voltage,
    a clamp circuit means which receives the composite video signal and a reference voltage from said reference voltage source, and clamps the sync chip level of the composite video signal to said reference voltage level,
    a detection circuit means, responsive to the clamped composite video signal from said clamp circuit means and a pulse signal applied thereto, for detecting and holding the voltage of the back porch part of said clamped composite video signal,
    a mixing circuit means which receives the reference voltage from said reference voltage source and detected voltage of said detection circuit means, and generates a signal of an intermediate voltage between said reference voltage and the detected back porch voltage,
    a separating circuit means for deriving synchronization signals by comparing the clamped composite video signal with said intermediate voltage signal,
    delay means, responsive to said synchronization signal, for generating said pulse signal to said detection means, a predetermined time period after said synchronization signals.

2. A synchronization signal separating circuit in accordance with claim 1, wherein
    said separating circuit means comprises a differential amplifier, which compares the clamped composite video signal with said intermediate voltage signal.

3. A synchronization signal separating circuit in accordance with claim 1, wherein
    said detection circuit means includes a switching circuit, responsive to said pulse signals, for passing said composite video signals only during said pulse signals, and a holding circuit means which is coupled to said switching means for holding the output thereof for generating the threshold voltage.

4. A synchronization signal separating circuit in accordance with claim 3, wherein
    said delay circuit means comprises a monostable multivibrator.

5. A synchronization signal separating circuit in accordance with claim 3, wherein
    said delay circuit means comprises at least one transistor with transmission delay caused by excess carrier in base region.

6. A synchronization signal separating circuit in accordance with claim 1, wherein
    said intermediate voltage generated by said mixing circuit is substantially in the middle of said reference and detected back porch voltages.

7. A synchronization signal separating circuit for deriving synchronization signals from a composite video signal, said circuit comprising:
    a reference voltage source for generating a predetermined reference voltage signal;
    clamp circuit means, receptive of said composite video signal, and said reference voltage signal, for clamping the sync chip level of the composite video signal to said reference voltage level;
    detection circuit means, responsive to said clamped composite video signal, for detecting the voltage of the back porch portion of said clamped composite video signal;
    mixing circuit means, responsive to said reference voltage signal and said detected back porch voltage, for generating a signal of an intermediate voltage between said reference voltage and said detected back porch voltage;
    separating circuit means, deriving synchronization signals by comparing the clamped composite video signal with said intermediate voltage signal; and
    delay circuit means for generating a signal pulse corresponding to the synchronization signal delayed by a specified delay time length;
    said detection circuit means including a switching circuit which passes the composite video signals only when the output signal of said delay circuit means is on, and a holding circuit means, coupled to said switching means, for holding the output thereof for generating the threshold voltage.

8. A synchronization signal separating circuit in accordance with claim 7, wherein;
    said delay circuit means comprises monostable multivibrator.

9. A synchronization signal separating circuit in accordance with claim 7, wherein;
    said delay circuit means comprises at least one transistor with transmission delay caused by excess carriers in base region.

* * * * *